(12) United States Patent
Boucadair

(10) Patent No.: US 9,065,888 B2
(45) Date of Patent: Jun. 23, 2015

(54) METHOD FOR OPTIMIZING THE ROUTING OF COMMUNICATIONS BETWEEN A PLURALITY OF TELEPHONY DOMAINS, CORRESPONDING SIGNAL, DEVICE AND COMPUTER PROGRAM

(75) Inventor: Mohamed Boucadair, Rennes (FR)

(73) Assignee: ORANGE, Paris (FR)

( * ) Notice: Subject to any disclaimer, the term of this patent is extended or adjusted under 35 U.S.C. 154(b) by 1132 days.

(21) Appl. No.: 12/526,915

(22) PCT Filed: Feb. 8, 2008

(86) PCT No.: PCT/FR2008/050200
§ 371 (c)(1),
(2), (4) Date: Oct. 7, 2009

(87) PCT Pub. No.: WO2008/110723
PCT Pub. Date: Sep. 18, 2008

(65) Prior Publication Data
US 2010/0091976 A1 Apr. 15, 2010

(30) Foreign Application Priority Data
Feb. 16, 2007 (FR) ...................... 07 01155

(51) Int. Cl.
*H04L 12/66* (2006.01)
*H04L 29/06* (2006.01)
*H04M 7/00* (2006.01)

(52) U.S. Cl.
CPC ............. *H04M 7/0072* (2013.01); *H04L 65/80* (2013.01); *H04M 7/0075* (2013.01)

(58) Field of Classification Search
CPC ....... H04L 47/122; H04L 47/12; H04L 45/24; H04L 45/70; H04L 47/22; H04L 47/10; H04L 45/00; H04L 45/22; H04L 45/28; H04L 47/11; H04L 47/30; H04L 47/2441; H04L 47/32; H04L 12/5601; H04L 12/5602; H04L 12/5693
USPC ............. 379/220.01, 221; 370/352, 353, 354, 370/355, 356, 357, 237; 455/445, 452, 453; 709/231, 232, 234, 235, 238, 239, 240, 709/241, 242, 243, 244

See application file for complete search history.

(56) References Cited

U.S. PATENT DOCUMENTS 6,122,255 A * 9/2000 Bartholomew et al. ........ 370/237
6,741,585 B1 * 5/2004 Munoz et al. ................. 370/352

(Continued)

FOREIGN PATENT DOCUMENTS

WO 2005027436 A1 3/2005

OTHER PUBLICATIONS

J. Rosenberg, H. Salama, M. Squire; RFC 3219—Telephony Routing over IP (TRIP); Jan. 2002; The Internet Society.*

(Continued)

*Primary Examiner* — Ahmad F Matar
*Assistant Examiner* — Kharye Pope
(74) *Attorney, Agent, or Firm* — David D. Brush; Westman, Champlin & Koehler, P.A.

(57) ABSTRACT

A method and apparatus are provided for optimizing routing of communications between a plurality of telephony domains. The method includes: detecting a congestion or congestion-risk phenomenon in a first telephony domain; and a phase for transmitting, in a signalling message, at least one information concerning the congestion or congestion-risk phenomenon, or congestion information, to at least a second telephony domain.

9 Claims, 7 Drawing Sheets

(56) References Cited

U.S. PATENT DOCUMENTS

| | | | |
|---|---|---|---|
| 6,876,627 B1* | 4/2005 | Rao | 370/230 |
| 7,002,906 B1* | 2/2006 | Basso et al. | 370/218 |
| 7,212,495 B2* | 5/2007 | Karri et al. | 370/238 |
| 7,437,458 B1* | 10/2008 | Stewart et al. | 709/226 |
| 7,565,448 B1* | 7/2009 | Schlesener et al. | 709/242 |
| 7,613,170 B1* | 11/2009 | Grabelsky et al. | 370/352 |
| 7,664,873 B1* | 2/2010 | Ghosh et al. | 709/238 |
| 7,813,265 B2* | 10/2010 | Patel et al. | 370/217 |
| 2001/0003522 A1* | 6/2001 | Masuhiro | 370/237 |
| 2002/0191595 A1* | 12/2002 | Mar et al. | 370/352 |
| 2003/0133443 A1* | 7/2003 | Klinker et al. | 370/353 |
| 2003/0185154 A1* | 10/2003 | Mullendore et al. | 370/230 |
| 2003/0235280 A1* | 12/2003 | Shafie-Khorasani et al. | 379/112.01 |
| 2004/0136324 A1* | 7/2004 | Steinberg et al. | 370/238 |
| 2005/0135254 A1* | 6/2005 | Taylor et al. | 370/237 |
| 2005/0135391 A1* | 6/2005 | Sung | 370/401 |
| 2005/0243725 A1* | 11/2005 | Wrenn et al. | 370/238 |
| 2006/0007863 A1* | 1/2006 | Naghian | 370/238 |
| 2006/0083193 A1* | 4/2006 | Womack et al. | 370/328 |
| 2006/0140176 A1* | 6/2006 | Farris et al. | 370/352 |
| 2006/0280162 A1* | 12/2006 | Zhao et al. | 370/352 |
| 2007/0028003 A1* | 2/2007 | Rudkin | 709/241 |
| 2007/0041326 A1* | 2/2007 | Babiarz et al. | 370/237 |
| 2007/0047446 A1* | 3/2007 | Dalal et al. | 370/237 |
| 2007/0086486 A1* | 4/2007 | Park et al. | 370/474 |
| 2007/0159977 A1* | 7/2007 | Dalal et al. | 370/238 |
| 2007/0167172 A1* | 7/2007 | Kim et al. | 455/456.1 |
| 2007/0297336 A1* | 12/2007 | Pitcher et al. | 370/236 |
| 2008/0159262 A1* | 7/2008 | Crable et al. | 370/352 |
| 2008/0273461 A1* | 11/2008 | Liang et al. | 370/235 |
| 2008/0304413 A1* | 12/2008 | Briscoe et al. | 370/235 |

OTHER PUBLICATIONS

K. Ramakrishnan, S. Floyd, D. Black; RFC 3168—The Addition of Explicit Congestion Notification (ECN) to IP; Sep. 2001; The Internet Society.*

International Search Report of corresponding French Application No. 0701155, filed Feb. 16, 2007.

Written Opinion of the International Searching Authority for corresponding International Application No. PCT/FR2008/050200, filed Feb. 8, 2008.

* cited by examiner

METHOD FOR OPTIMIZING THE ROUTING OF COMMUNICATIONS BETWEEN A PLURALITY OF TELEPHONY DOMAINS, CORRESPONDING SIGNAL, DEVICE AND COMPUTER PROGRAM

CROSS-REFERENCE TO RELATED APPLICATIONS

This Application is a Section 371 National Stage Application of International Application No. PCT/FR2008/050200, filed Feb. 8, 2008 and published as WO 2008/110723 on Sep. 18, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure pertains to the field of telephony on Internet type networks or IP (Internet protocol) type networks. The disclosure pertains more specifically to the optimizing of the routing of communications between a plurality of telephony domains and especially the setting up of routing paths between a source and a destination. These routing paths which often cross telephony domains managed by different operators (also called service providers) are announced by means of an information signal to all the domains crossed.

More particular, the disclosure pertains to the taking account of phenomena of congestion between operators (or access providers) and the improvement of reactivity between remote telephony domains.

An IP network is a backbone network adopted by a set of operators to pool their heterogeneous service offers, including IP telephony, commonly known as VoIP (voice over IP) more generally grouped together under the heading of conversational services (also encompassing videophone or conferencing type video applications).

The deployment of such real-time voice or video applications to the all IP and therefore the migration of the switched network (traditionally designated as a switched telephony network or STN) is a goal of operators. This means that the operators must be able to provide comprehensive coverage on a worldwide scale to these services. This does not amount solely to a need to ensure reference points on the entire globe but also entails the capacity to offer customers the possibility of linking up to any telephone destination (including customers of other operators).

This total coverage is obtained by setting up interconnection agreements with other operators or third-party service providers in order to be able to extend the range of a service outside the administrative boundaries of each service provider.

In line with this dynamic, it is planned that the cooperation between VoIP/ToIP (telephony over IP) service providers will intensify in the short or medium terms. This intensification should enable the transmission of multimedia traffic (chiefly related to voice or video) to termination points located outside a single management domain for the management of telephony over IP (also called an ITAD or IP telephony administrative domain) managed by a single operator (also called a service provider). These two terms are used without distinction in the rest of this document. This cooperation between service providers is all the greater as the classic bilateral type agreements do not ensure total coverage required by the operators and their customers.

Furthermore, telephony offers deployed over an IP network must meet service quality constraints such as high availability and high tolerance with regard to malfunction. The constraint of availability of the service does not pertain solely to the telephony domains (i.e. the service layer) but also to the nodes which manage the routing of the IP streams (i.e. the transfer level).

Here below in this document, the following terms are used:
LS (location server): this is an entity or a functional element of a telephony domain (ITAD) which manages the locating of the clients and of the routes of a local ITAD. This entity may interface with a neighboring LS to learn the location of the clients managed by the other ITADs;
AS (autonomous system): this is a set of IP resources managed by a single administrative entity, also called an IP connectivity provider. In the context of the BGP (border gateway protocol) inter-domain routing protocol [RFC1771], each AS is identified by a unique identifier. This AS is also called a "IP transfer domain";
"Transfer layer or level": the two ISI layers, namely the network and transport, throughout this document.

BACKGROUND OF THE DISCLOSURE

1. Prior Art

In classic telephony (STN or switched telephony network), telephony operators set up bilateral agreements to extend the overall coverage of the telephone service. The level of coverage attained essentially depends on the number of agreements made. Very roughly, we may assume that there are two categories of telecommunications operators: local operators and/or national operators and worldwide operators. The major worldwide operators set up a large number of agreements and can thus link up with most existing destinations. Local operators set up only a limited number of agreements and for example only one or two agreements with the major operators. Thus a historic national operator in a developing country will make agreements with other national operators and one or two agreements with worldwide operators to send communications to the rest of the world.

At present, most operators migrate or are thinking of making their STN networks migrate towards solutions and infrastructures based on the IP network. To work along with the deployment of VoIP services, the IETF (Internet engineering task force) has launched many standardization tasks. Several protocols have thus been specified, among them:
SIP (Session Initiation Protocol)
SDP (Session Description Protocol)
RTP (Real-time Transfer Protocol)
RTCP (Real-time Transfer Control Protocol)
MGCP (Multimedia Gateway Control Protocol)
SAP (Session Announcement Protocol) and
TRIP (Telephony Routing Over IP, [RFC3219])

These protocols meet different needs and especially incorporate the signaling and control of calls, the exchange of media streams and their control and the exchange of information for the routing of the calls.

For further information on the TRIP protocol, reference may be made to the standardization document RFC3219. The present disclosure can be implemented especially but not exclusively in the context of this RFC3219 specification.

The TRIP protocol enables interconnected ITADs to exchange all the destinations that they can link up to and facilitates especially the selection of the gateway (motorway or backbone) most appropriate to sending IP telephony traffic to the STN network. The TRIP protocol is implemented by the LS (location servers) which propagate TRIP routes containing attributes used to define the routes in question. The use of this special protocol is independent of the type of signaling protocol deployed for the effective establishment of the calls. The TRIP protocol can be used jointly with the SIP, H.323 or any other signaling protocol.

Each LS maintains a local routing database called TRIB (telephony routing information database). This routing database is fed with announcements received from neighboring LS (from another telephony domain for example). The working of the TRIP protocol is similar to that of the BGP (border gateway protocol). The announcements between LS neighbors are made in the form of route updating messages called UPDATE messages. These messages are defined by the TRIP protocol and are exchanged between the LSs to inform an LS of the same domain or of the neighboring domain about the routes available.

Referring now to FIG. 9, a description is provided of the activation of the TRIP protocol between different ITADs (here below, we shall also use the term "telephony domain" or simply domain to designate an ITAD), each ITAD being administered by a single telephony operator. These operators each have one or more LSs and one or more proxy servers (or PS). Each LS maintains a routing base which he feeds with announcements received from his neighbours (situated in another domain) and LSs of his own domain. These announcements are updated and distributed to other neighbors if the agreements permit it. Each PS is responsible for setting up calls and processing signaling information received from clients or other PSs.

In FIG. 9, only the LSs are shown. Thus, ITAD4 84 for example updates the announcements received from the ITAD5 85 and re-propagates them to ITAD3 83. It must be noted that when an ITAD is not necessarily deployed on a single IP transfer domain also called an AS.

From a routing viewpoint, an LS may process three types of routes:
- external routes provided by the LSs situated in the neighboring ITADs;
- internal routes provided by the LSs situated in the same ITAD;
- local routes configured locally in each LS to be injected into the TRIP process. This operation is performed either by static configuration or by redistribution of information coming from other routing protocols.

Thus, four types of TRIB are generated by an LS as illustrated in FIG. 10. These tables exist for a same LS. The relationships between these tables are illustrated with reference to FIG. 10. These tables comprise:
- Adj-TRIBs-In 92 (Adjacent TRIB in): this table stores the routing information conveyed by update messages. These pieces of routing information, also called routes, are the inputs of a route selection process 91 (decision process). A given LS keeps an Adj-TRIB-In 92 (adjacent TRIB-in which stores all the route announcements received from an adjacent LS) per neighboring LS;
- Ext-TRIB 94 (External TRIB): this table contains the result of a route selection process applied to the external routes 95 (Adj-TRIBs-IN) and local routes 96 (local routes). Only one Ext-TRIB table (external TRIB table) is kept per LS. The prior-art techniques make it possible to choose only one route per destination;
- Loc-TRIB 90 (Local TRIB): this table contains the local routes resulting from the application of the local routing policies to each LS;
- Adj-TRIBs-Out 93 (Adjacent TRIB out): this table contains the routes that the local LS will announce to its peers.

The TRIP protocol is used to store one and only one route per destination in the local TRIB. This route is the one announced to the peers of a given LS, i.e. to the neighboring LSs (which may be in the same ITAD or in a different ITAD) when there is an agreement between then. To this end, TRIP implements a route selection process to determine the best route to be stored in its local TRIB. If a route to this destination already exists, then the selection process is invoked. If this new route is chosen by the process, it replaces the former one in the local TRIB.

2. Drawbacks of the Prior Art

One drawback of this prior-art technique is that it cannot be used to take account of and manage blockages or congestion phenomena in a domain or congestion in the external links of this domain with other neighboring domains. These phenomena may for example be due to overloading (in terms of the numbers of communication links to be processed simultaneously or malfunctions for example). In other words, the current technique does not propose means to manage the resilience of the routes announced by the TRIP protocol and especially to cope with the phenomena of congestion of telephony routes between the ITADs.

A congestion phenomenon may correspond especially (and not only) to:
- an incapacity of an ITAD to process calls following an insufficiency or unavailability of resources for routing calls;
- an impossibility for a given ITAD to take account of calls formulated by subscribers of the domain; and/or
- an impossibility of routing calls to a given destination, such as another ITAD, or again a difficulty for transmitting calls to the subscribers of the ITAD.

This may be due for example to the use of the bandwidth (BW) reserved for the telephony streams (the available bandwidth is close to zero), rate of active sessions close to the threshold borne by a telephony apparatus, an unavailable IP link, an unavailable link between two ITADs or an available bandwidth value close to zero.

Such phenomena may occur especially within interconnection gateways of the telephony domains (ITAD). Indeed, according to current techniques, one and only one route is announced if it exists for a given destination. Now, in the context of VoIP/ToIP, congestion phenomena may arise between the telephony domains. To date, there is no mechanism enabling the operator managing this domain to inform the operators of neighboring domains about the existence of this congestion phenomenon. The distant domains that do not possess mechanisms to inform them on the state of a route (whether congested or not) continue to select this route. The communications therefore cannot reach their destination.

An illustrative embodiment of the present invention makes it possible to find a solution to this technical problem.

SUMMARY

The solution proposed by an illustrative embodiment of the invention mitigates these prior-art drawbacks by a method for optimizing the routing of communications between a plurality of telephony domains.

According to an embodiment of the invention, such a method comprises:
- a phase for detecting a phenomenon of congestion or of risk of congestion in a first telephony domain (the term used is congestion notification and/or pre-congestion notification (enabling anticipation on a congestion));
- a phase for transmitting, in a signaling message, at least one piece of information on said phenomenon of congestion or of risk of congestion, called congestion information, to at least one second telephony domain.

Thus, an embodiment of the invention is used to take account of congestion or pre-congestion phenomena which may arise within telephony domains, also called ITADs. This taking into account enables a domain to send information on the phenomenon to neighboring domains. This information, as the case may be, may enable other domains to react or at least to be warned of the occurrence of the congestion.

According to one embodiment of the invention, said signaling message is a message for defining a telephony route, used to reach a given telephone destination (also called a route announcing message).

Thus, an embodiment of the invention can be used to transmit congestion information or pre-congestion information (here below in this document, this phenomenon shall be designated solely by the term "congestion") by means of a telephony route. Indeed, the communications protocols between the telephony domains enable the ITADs to exchange routes in order to link up to given destinations. An embodiment of the invention takes account of these exchanges in inserting the information representing congestion on these routes. It is therefore not necessary to define a new information exchange protocol between the telephony domains, thus avoiding the need to modify the architectures of the different domains. A specific field, called a field "C" can be used to transmit the congestion information within the routes exchanged. This field "C" can for example be encoded on one bit in order to indicate the fact that a given route is congested (value 1) or not congested (value 0).

According to one particular characteristic of an embodiment of the invention, said method comprises:
- a preliminary phase for negotiating a capacity for exchanging said congestion information between said telephony domains;
- a phase of initial propagation of a main route between said first and second telephony domains.

According to one particular embodiment of the invention, said detection phase comprises:
- a step for measuring at least one piece of information representing a load level and/or a rate of rejection of communications within said first telephony domain;
- a step for comparing said piece of information representing a load level and/or a rate of rejection with at least one predetermined threshold, delivering said congestion information;

and said transmission phase comprises:
- a step for propagating at least one backup route for said main route.

Thus, the method according to an embodiment of the invention enables the different telephony domains to take account of their respective capacities for exchange. Indeed, the telephony domains are generally managed by different telephony operators who do not obligatorily implement the protocols for exchanging information between domains in the same way. This characteristic mitigates this drawback of the prior art in enabling the exchange capacities of the domains to be negotiated prior to a transmission of information. Furthermore, this enables the measuring of the values representing congestion phenomena such as rates of rejection of new calls or controls on load of communications apparatuses. It is thus possible to have real-time knowledge of the state of a telephony domain and transmit a backup route either at the beginning of the occurrence of the congestion or beforehand, in the pre-congestion state.

According to one particular embodiment of the invention, said method comprises, in at least one second domain:
- a step for receiving said backup route or routes;
- a step for adding said backup route or routes to a set of routes also comprising said main route.

Thus, an embodiment of the invention can take account of several routes to reach a same telephony destination. Indeed, according to the prior-art techniques based on the TRIP protocol, the telephony domains exchange one and only one route per destination. At a given instant therefore, in these TRIP implements of the prior art, there is only one path starting from a given telephony domain to link up to a given destination. An embodiment of the invention in this approach can be used to overcome this drawback by adding new routes to link up to the given destination. The main route is not overwritten and may therefore be used by the component of the telephony domain, for example to enable the maintenance of a communication call that has already begun.

The backup routes can be propagated simultaneously to said second telephony domain.

Thus, during an occurrence of a congestion phenomenon, the method of an embodiment of the invention, in one particular embodiment, can be used to simultaneously propagate a set of backup routes for linking up to one and the same destination. The telephony domain then has, during the congestion phenomenon, several routes available amongst which it will make a choice when a subscriber to this domain seeks to link up with a destination that is situated in the domain or passes through the domain from which it has received the backup routes.

The backup routes of said set of backup routes may also be propagated to said telephony domain in succession, depending on the occurrences of congestion phenomena successively observed on said pre-propagated backup routes.

Thus, the different routes constituting the set of backup routes are propagated only after congestion in a backup route that has been pre-transmitted. The backup routes get added to the existing routes within the telephony domains. In one particular embodiment of the invention applied to the TRIP protocol, the backup routes get added to the routing table of the locating servers forming the domain.

In this case, the method may comprise a step for selecting a backup route from amongst at least two backup routes available in said set of routes, as a function of a piece of information on selection transmitted with each of said backup routes.

The backup route chosen will thus be the most efficient one according to the selection criterion chosen, from among those available.

According to one particular embodiment of the invention, said method comprises, in at least one second domain:
- a step for receiving said backup route;
- a step for replacing a current route by said backup route.

Thus, according to this characteristic, the method can take account of the occurrence of congestion phenomena by enabling the propagation of a backup telephony route. Indeed, in the case for example of an exchange of routes between the telephony domains by means of the TRIP protocol, an embodiment of the invention mitigates the congestion phenomena by substituting a backup telephony route for a main telephony route preliminarily propagated between two domains, thus preventing new telephone calls from using the congested telephony domain.

According to one particular embodiment of the invention, said method comprises a step for replacing said main route by said backup route within a routing table of a locating server situated within said second telephony domain.

In this particular embodiment of the invention, the main route, pre-registered within the locating servers present in the second telephony domain, is replaced by the backup route. Such a replacement has the advantage of not increasing the volume of the routing tables present in the locating server of the telephony domains.

Said backup route, having become a current route, can recursively be the object of a replacement by a new backup route during an occurrence of a new congestion phenomenon on said backup route.

Thus, an embodiment of the invention does not restrict the replacement of the main route by a single backup route. Indeed, the occurrence of congestion phenomena is not limited solely to the main routes and can also occur within backup routes. An embodiment of the invention thus mitigates this drawback by enabling the replacement of a backup route by a new backup route, and does so as many times as necessary so long as congestion phenomena occur.

An embodiment of the invention also pertains to a signal exchanged between two telephony domains of a communications system implementing a plurality of telephony domains.

According to an embodiment of the invention, such a signal comprises at least one field indicating a state of congestion or of risk of congestion of at least one telephony domain.

According to one particular characteristic of an embodiment of the invention, said signal furthermore comprises at least one field for identifying at least one route passing through said domain.

According to one particular characteristic of an embodiment of the invention, the signal comprises an attribute comprising the following fields:
- a congestion indicating field or "flag";
- a backup route number indicator field or "path identifier";
- an "address family" defining field for said backup route;
- an "application protocol" defining field associated with said backup route;
- an address length definition or "length" field;
- an field for indicating said "address".

An embodiment of the invention also pertains to an apparatus for routing at least one telephony route within a telephony domain.

According to an embodiment of the invention, such an apparatus comprises means for routing communications between a plurality of telephony domains, said routing means comprising:
- means for detecting a phenomenon of congestion or of risk of congestion in a first telephony domain;
- means for transmitting, in a signaling message, at least one piece of information on said phenomenon of congestion or of risk of congestion, called congestion information, to at least one second telephony domain.

More generally, such a device comprises means for implementing steps of the optimizing method as described here above.

An embodiment of the invention also concerns a computer program product downloadable from a communications network and/or stored on a computer-readable carrier and/or executable by a microprocessor, and comprising program code instructions for the execution of the method for optimizing as described here above.

BRIEF DESCRIPTION OF THE DRAWINGS

Other features and advantages shall appear more clearly from the following description of a preferred embodiment, given by way of simple, illustrative and non-exhaustive examples, and from the appended drawings, of which.

DETAILED DESCRIPTION OF ILLUSTRATIVE EMBODIMENTS

Figure 1:
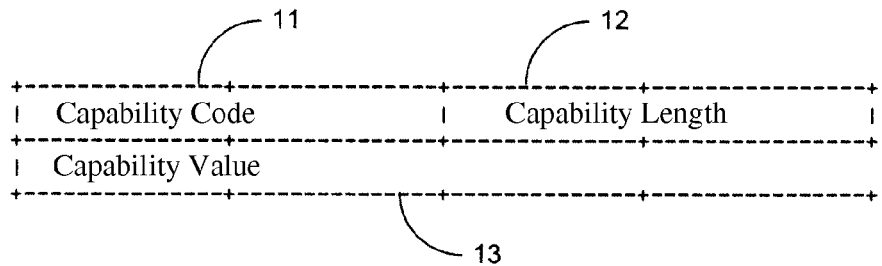
FIG. 1 illustrates the format of a "Capability" attribute.

Here below, we present an implementation of an embodiment of the invention applying the TRIP protocol at the service layer. However, it is clear that the invention cannot be limited to this particular protocol but can also be applied to any route exchange protocol for exchanging routes between IP telephony operators. It must be noted that this invention cannot be applied only to telephony but also especially to inter-domain video conferencing, inter-domain instantaneous messaging, inter-domain presence services and more generally any service calling for the location of resources beyond the administrative boundaries of a single service provider.

1. Reminder of the Principle of an Embodiment of the Invention

An embodiment of the invention therefore proposes to provide telephony over IP platforms with simple and efficient means to mitigate inter-domain congestion phenomena, i.e. congestion phenomena between different ITADs. The present description proposes two embodiments of the invention applied to the TRIP protocol. It is thus possible to optimize the routing of communications between the telephony domains as a function of the various situations of congestion which can occur within telephony domains.

The general principle of an embodiment of the invention relies on a detection and processing of congestion phenomena. Thus, the method of an embodiment of the invention proposes the detection of congestion phenomena in or between the ITADs and the providing of replacement or backup solutions for routing the traffic efficiently while at the same time avoiding domains in which the congestion phenomena are occurring. In other words, the goal of the mechanism of an embodiment of the invention is to enable the telephonic system (i.e. the control elements in an ITAD) to react when the phenomena of congestion are observed locally or along an ITAD path to link up to remote telephone connections (i.e. destinations attached to other ITADs than the local domain).

These solutions may consist of the setting up of a new routing path for routing the traffic which makes it possible to avoid the telephony domain in which the congestion is occurring or prior to the arising of a congestion phenomena (a situation known as a pre-congestion situation) for example through measurement mechanisms, thus making it possible to prevent the phenomena and if necessary to distribute the load on other routes.

Depending on the embodiments of the invention, such backup routes can then be propagated to other neighboring telephony domains either through a multiple route propagation protocol or by the application of a classic propagation mechanism.

In the two embodiments described, the method of the invention can be used to detect inter-domain congestion phenomena and enable remote telephony domains to react in order to propose one or more new routes for routing calls which enable congestion to be avoided. In these embodiments, a piece of information on congestion or pre-congestion is conveyed to neighboring domains by means of a call route propagation (signal).

The TRIP protocol enables servers for locating TRIP domains to exchange routes making it possible to link up to destinations through updating messages called UPDATE messages. At least one embodiment of the invention uses these messages in order to convey congestion information. In at least one particular embodiment of the invention, one or more backup routes are conveyed at the same time. These backup routes are then used by neighboring location servers to take account of the difficulties of transfer related to the congestion.

According to either of the two embodiments of the invention it is possible to convey to the locating servers either only one backup route or several routes. In either of these cases, new attributes (which are used after the exchange of the transaction "capabilities" between the locating servers in the "OPEN" type messages) are defined within route update messages so that the servers implementing the TRIP protocol are capable of exchanging relevant information on these new backup routes. These attributes are called "TRIP" routes and, as the case may be, they enable the propagation of a backup route for a congestion route or several routes (they may be likened to schedules making it possible to reach a given destination).

When the congestion phenomenon comes to an end, the method of an embodiment of the invention can offer the possibility of a return to previously used routes. Thus, the modification of the routes within the telephony domain is only temporary.

Thus, as presented, in order to be able to exchange schedules (routes) with one another, the neighboring locating servers (LS) which are part of two neighboring telephony domains negotiate, before the effective exchanging of routes, their respective management capabilities ("Capabilities") in terms of supported extensions, as described in RFC3219. The format of the optional attribute, i.e. the "Capability" attribute is described with reference to FIG. 1. It can be noted that this attribute is optional and is not necessarily supported by all the TRIP implementations.

It contains three fields 11, 12 and 13:
a first "Capability Code" field 11 having a length of two bytes contains a code identifying the Capability;
a second "Capability Length" field 12 also having a length of two bytes contains the length of the "Capability";
a third "Capability Value" field 13, of variable size, contains the value of the Capability.

This negotiation of capability makes it possible, in both embodiments described here below, to make sure that the proxy servers located in the various domains are working properly and especially makes it possible to exchange information on the routes by means of a TRIP route attribute in which the embodiments presented here below make adaptations.

2. First Embodiment

Propagation of Multiple Routes

A first particular embodiment of the method of the invention consists of a management of multiple routes within telephony domains.

This particular embodiment of the invention therefore consists in enabling the telephone system, namely the control elements present in the telephony domain, to react when congestion phenomena are observed locally or along an ITAD path (or schedule) to link up to remote telephone destinations attached to ITADs other than the local telephony domain of the user.

To this end, an embodiment of the invention implements a phase for activating a mechanism for taking charge of multiple routes in order to exchange several routes towards a same destination at least for the duration of the congestion phenomena. This activation phase takes the form of a preliminary phase for negotiating a capability of exchanging congestion information between the telephony domains through multiple routes serving a same destination. Then, once the congestion phenomena are no longer observed, the previous behavior, without the support of multiple routes, may again be adopted between neighboring domains.

These new congestion circumventing routes can then be exploited by the proxy servers (PS) to pass telephone calls to remote telephony destinations.

Apart from mitigating the above-mentioned drawbacks, such an implementation also optimizes the size of the telephone routing tables. Indeed, during the activation of a multiple route management mechanism of this kind, the size of the routing tables of the proxy servers may tend to increase substantially. Such an increase is due to the maintenance needed within these tables for several inputs enabling the routing of the telephone calls and passing through several different routes.

This particular embodiment of the invention avoids this drawback by proposing the installation of an additional route only to guard against congestion phenomena.

Such a route may thus be used as an alternative route or a backup route for inter-domain calls going through the congested network domains/links/resources and may be uninstalled once the congestion phenomena are no longer observed. The procedure is repeated as many times as necessary to cope with call setup requests.

It is also possible to simultaneously transmit several routes for circumventing a congested domain. Several routes to the same telephone destination may be installed in a local telephone routing table of a domain during congestion episodes that occur in neighboring domains. It is then possible to circumvent a congestion phenomena without in any way thereby de-stabilizing the traffic along the default route.

In this way, the size of the routing tables will not be multiplied but will only increase by as many backup or secondary routes as there are congested routes and only for the time of the congested phenomena. In fact, the "critical size" of the telephone routing tables is no longer durably attained because the backup routes are uninstalled once the congestion phenomena are no longer current.

The installation and de-installation of the routes of the telephone routing tables do not induce instability or oscillation in telephone traffic because the telephone domains crossed always have a route towards the destination in question. Thus, routing loops (a phenomenon in which a route runs several times through the same domain before reaching its destination) are not induced.

In the following paragraphs, a detailed description is given of a procedure for exploiting multiple routes in order to avert congestion phenomena.

2.1 Use of a Modified TRIP Route Attribute

Figure 2:
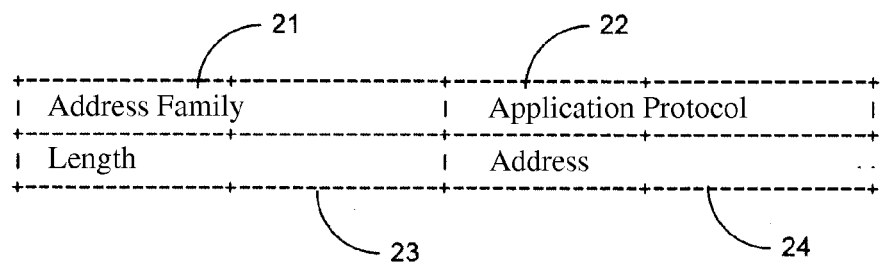
FIG. 2 presents the conventional format of the "TRIP Route" attribute according to the RFC3219 specification.

The current specification of the TRIP protocol makes it possible to select and announce one and only one route per destination (if such a route exists). The TRIP route attribute format defined by the RFC3219 is illustrated in FIG. 2.

It contains four fields 21, 22, 23 and 24 respectively corresponding to "address family", "application protocol", "length" and finally "address". The first three fields 21, 22 and 23 have a size of two bytes while the last field 24 has a variable size.

Figure 3:
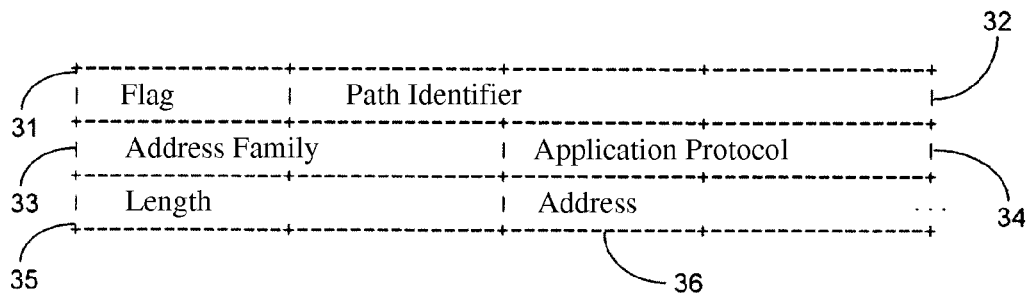
FIG. 3 presents the format of the "TRIP Route" field modified according to an embodiment of the invention for the transfer of multiple routes.

The TRIP route attribute may be seen as the schedule indicating a path to be followed to link up to a given destination. This schedule indicates several telephony domains through which the communication will pass to reach the destination. In this embodiment of the invention, TRIP route is modified to convey a piece of information on congestion. The modified TRIP route attribute format thus enables a definition of a state of congestion for a given route. This route is defined by the fields forming the attribute. To permit the announcement of several TRIP routes serving a same destination, the TRIP route attribute is modified as can be seen in FIG. 3.

It contains six fields numbered 31 to 36, for which the denomination and the size are the following:
 a Flag field 31 with a size of one byte;
 a Path Identifier field 32 with a size of three bytes;
 an Address Family field 33 with a length of two bytes;
 an Application Protocol field 34 with a length of two bytes;
 a Length field 35 with a length of two bytes;
 an Address field 36 of variable length.

The Address Family, Application Protocol, Length and Address fields are defined in section 5111 of the RFC3219 standard, and are recalled in an Appendix to the present description.

The new fields according to an embodiment of the invention have the following meanings:
 the "Flag" field 31 is used to characterize the announced route. In the context of this implementation, the value "1" is used to inform the neighboring LSs that this route is the one selected by the local TRIP process. This indication is used to inform the neighboring LSs of the local preference in the event of multiple routes. Barring information to the contrary on the part of the neighboring LS, this route will be used by default to route the traffic to the final destination. Other values may be specified according to need.

For example, in a particular embodiment, this indicator could provide information on the level of Quality of Service. In another embodiment, in which the set of network links is secured, this indicator can specify whether this route is a main route or a secondary route (or a backup route or a replacement route).

the "Path Identifier" field 32 is introduced to differentiate the fields used for the same destination, i.e. one or more prefixes. This field contains a value where information is provided by the telephony operator. This value depends on the TRIP implementations and has no meaning except locally.

Within this modified attribute, the Flag field 31 is used especially to indicate the nature of the route (whether it is a main route or a backup route during the occurrence of congestion phenomena). The first bit (also called a field C) of this flag field having a length of one byte, takes the value 0 or 1 depending on the nature of the route. It is therefore a field that indicates whether the we are in the presence of a backup route enabling the mitigation of a congestion phenomenon (value 1) or a simple secondary routing route in the event of a use of multiple routes for the transfer of telephone calls (value 0). Thus, a value 1 in this embodiment indicates that the schedule contained in the modified TRIP route attribute is a replacement schedule whose goal is to divert the traffic from a congested telephony domain.

Naturally, other embodiments can be envisaged, such as for example an indication of a percentage of the load of a route instead of a simple binary value.

2.2. General Activation Procedure

Figure 6:
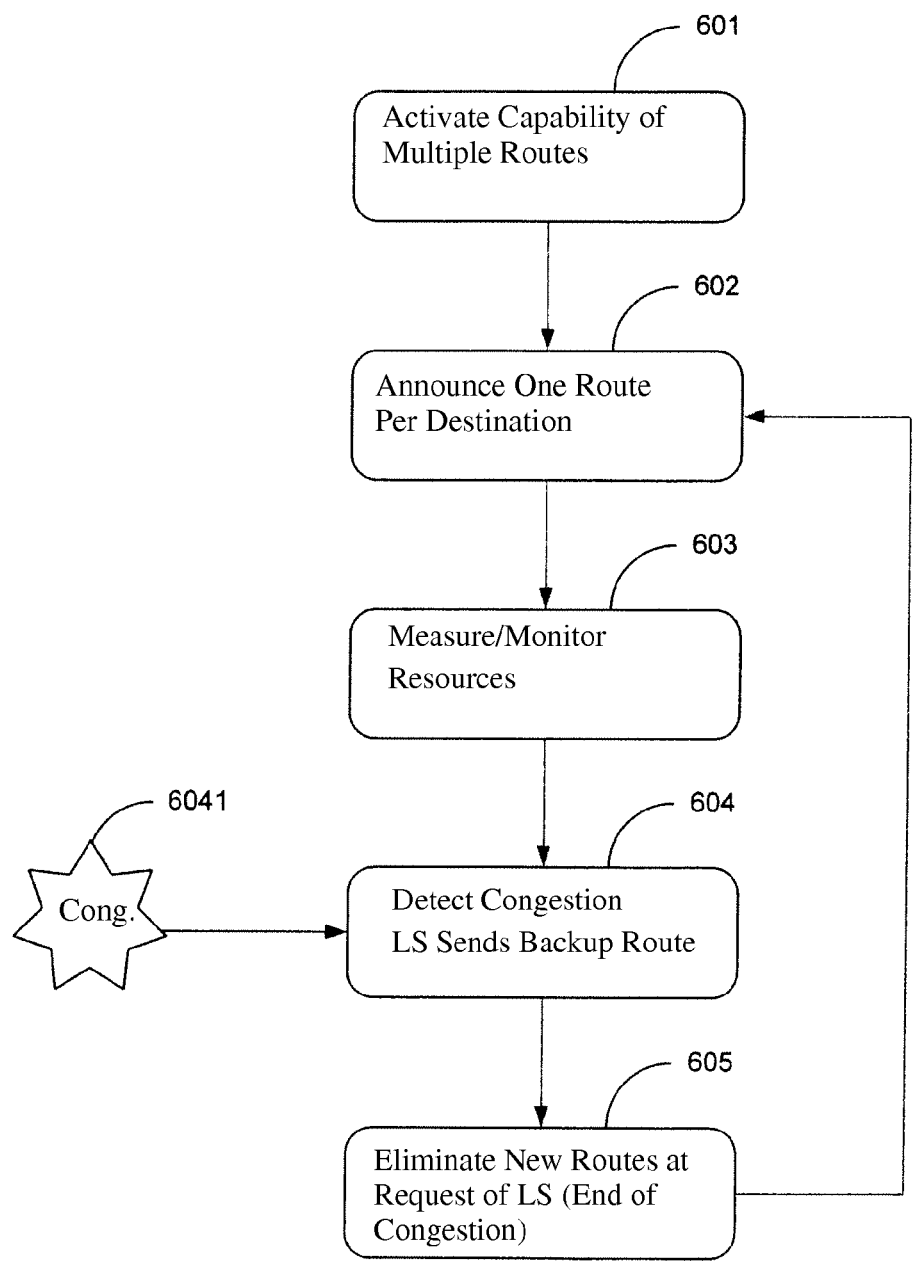
FIG. 6 describes a procedure for replacing a conveying route related to the detection of congestion phenomena.

Referring to FIG. 6, a description is now given of the various phases for implementing the activation procedure. This procedure consists of five steps:
 activating (601) a capability of propagation of multiple routes between two neighboring LSs;
 in the event of normal traffic, adopting (602) a classic TRIP behavior and announcing one and only one route per destination;
 deploying (603) means for measuring and monitoring telephone resources in order to detect congestion and scarcity of resources;
 detecting (604) a congestion phenomenon 6041: a TRIP LS then sends a backup route with a particular indication to all its neighbors. The LS that has received these announcements does not overwrite the routes already installed in its routing table but adds these new routes;
 elimination (605) at the request of the local LS, of the new routes and a return to the state for adopting the classic TRIP behavior (602) when the congestion phenomena have disappeared.

2.3 Activating the Capability of Management of the Multiple Routes Between Two Neighboring Telephony Domains In order to avert the congestion phenomena and increase the capability of processing inter-domain calls, the procedure of an embodiment of the invention is activated as follows:
 negotiating a capability to manage multiple routes at the opening of a TRIP session. At the opening of the TRIP session, the neighboring TRIP pairs activate a mechanism for managing multiple routes by means of an exchange of capability (also known as Route Multiple Capability);
 when the phase for exchanging capabilities is completed, the neighboring TRIP pairs adopt the classic TRIP behavior and by default exchange one and only one route per telephone destination. Nevertheless, the format used to send the routes in an updating message is the new modified TRIP route attribute defined here above.

2.4 Identification of the Backup Routes

To announce the TRIP routes, the new modified TRIP route attribute is adopted by default. This TRIP route attribute format contains a "Flag" field (c.f. 2.1). The Flag field is used to characterize the announced route. The value "1" is used to inform the neighboring LSs that this route is the one selected by the local TRIP process. This indication is used to inform the neighboring LS of the local preference in the event of multiple routes. Barring indications to the contrary on the part of the neighboring LS, this route will be used by default to convey the traffic to the final destination.

In the context of the prevention of congestion, the backup routes are identified by a "Flag" field whose value is greater than one and lower than the maximum of the multiple routes supported by the neighboring LSs. This number is negotiated when the TRIP session is being opened). Thus, a backup route is characterized by a "Flag" field value equal to "2", and so on and so forth. When the main route is congested, a second route is announced with a "Flag" field whose value is equal to "2". If this route is congested in turn, a third route can be announced with a "Flag" field equal to "3" and so on and so forth.

Should a local LS not have any backup route available to it, it positions the first bit of the "Flag" field (FIG. 3, field 31) also called a field "C" at "1". This positioning is used to inform the other LSs that the main route is congested. When the route undergoes no congestion, the value of this field is "0".

In another embodiment, it is also possible to envisage the adoption of this procedure even when there are several routes, in order to indicate the congestion state of all the routes.

2.5 Detection of Telephone Congestion Phenomena

Each telephone operator implements a mechanism for measuring and monitoring its ITAD in order to have a real-time perception (or at least a short-term and medium-term perception) of its local capability in terms of managing new phone calls (which for example may be expressed in the form of a rate of rejection of new calls).

These measurement mechanisms can be reduced to the simple control of the load of apparatuses invoked to set up telephone calls. Each operator can configure a threshold beyond which it will be deemed to be the case that its ITAD will be/is congested. This threshold can be common to all the operators or it may be a local threshold. Furthermore, two thresholds can be distinguished: a congestion threshold above which the congestion phenomena are potentially possible (i.e. the congestion phenomena have not yet been observed but are potentially possible in the future) and a congestion threshold that reflects the effective occurrence of congestion phenomena. The pre-congestion notification can be sent according to a local policy to each operator. To illustrate this, it can be imagined that a given operator sends a notification of pre-congestion when three-quarters of its internal resources or links connecting to it other domains are used. This rate may vary according to the operators. It can also be expressed in the form of a percentage of resources used/resources available.

In the context of this embodiment of the invention, no distinction is made between these two thresholds, both equally well referenced by the term "SeuilCongestion". It must be noted that in the present description, the terms pre-congestion and congestion as also the terms "pre-congested" and "congested" are used without distinctions.

2.6 Sending Multiple Routes

Thus, as already mentioned, the locating servers LS, also called TRIP pairs, exchange routing information as specified in the TRIP protocol. When the TRIP session is opened between the TRIP LSs, they exchange the capability of activating the multiple route mechanism including the maximum number of multiple routes that a local LS can announce to its neighbor. Nevertheless, the TRIP LSs do not make any automatic and routine announcement of the multiple routes but comply with the classic TRIP specifications (only one route is announced per telephone destination/prefix).

Once the congestion threshold is reached in an ITAD (i.e. once the local resources and/or the inter-domain links are in a state of pre-congestion or congestion), the local LS sends an announcement containing an indication of congestion to all its neighbors to which this ITAD has sent announcements of routes. Upon reception of these update messages with an indication of congestion, the receiver LSs send backup routes to the destinations whose main path passes through the congested domain (i.e. announcements of telephone prefixes that can be linked up to from the congested ITAD). These new routes (to these destinations) do not replace the routes already present in the routing tables of the TRIP announcement receiver LSs. This announcement contains routes through the modified TRIP Route attribute. This TRIP Route attribute especially enters information into a field called "Flag" whose value is positioned at "2" to inform the neighboring LS that this route is the backup route of another route already present in its routing tables.

This procedure can be reiterated if the backup route is congested in turn. The "Flag" field is incremented by one.

Should an LS of an ITAD, neighboring the congested ITAD, have no backup route and should the main route be congested, it uses the field "C" (in giving it a value) at "1" to inform its neighbors that this route is congested.

When the congestion threshold is no longer attained, the congested LS sends an update message in positioning the "C" bit at zero. Upon reception of this update, the LSs of the neighboring ITADs neighboring the congested one, i.e. those that have sent out updating announcements for updating the backup routes, send UPDATE messages with a "Withdrawn-Route" attribute to de-install the backup routes of the routing tables of their respective TRIP neighbors.

Consequently, the use of the memory needed for the routing tables will be thus reduced.

2.7 Signaling the Selected Route

When a proxy server (PS) wishes to set up a call to a given destination, it consults the LS routing tables which maintain one or more routes, one of which is not congested. The selected route is the last route received by the local LS as a backup route of a route already present in the routing tables. The main route is identified by a "Flag" field whose first bit is positioned at "1". The process of selecting a route can take account of the next bits of the flag field for the selection of the best route. Thus, the route selection process could choose the route for which the flag field is the greatest. More generally, a piece of information on selection other than the flag field can be planned to optimise the selection of a secondary route from amongst several available routes in order to avoid the congested routes.

As already indicated, in the context of telephony over IP, the information contained in the TRIB helps the servers of the VoIP to choose the path to be followed to link up to a given telephone destination. For example, in the case of an SIP service platform, the proxy server (PS) asks the local LSs about the availability of routes to link up to a given prefix. Should the procedure for preventing congestion be activated between two neighboring ITADs, two scenarios are possible:

the proxy server (PS) has chosen the route selected by the classic TRIP route selection process. The main route therefore is not congested. In this case, the SIP messages are not impacted. The SIP query will then follow the inter-ITAD path as selected by the classic TRIP route selection process;

the proxy server (PS) has chosen a secondary route, either to prevent a congestion of the main route or because this main route is already congested. The "Route" field of the SIP messages has to be valued in order to be made to conform with the "RoutedPath" attribute of the routes chosen by the proxy server (PS). It is made to conform in this way by the proxy servers (PS) through the insertion of an "Route" field whose value is deduced from the list of the ITAD_PATH segments as entered by the "RoutedPath" attribute. To this end, the "Route" field of the SIP protocol defined by RFC3261 is modified according to the following BNF grammar (the text in bold highlights the modifications made to the "Route" field):
Route="Route" ":" 1#name-addr [route-extension]
name-addr=[display-name] "<" addr-spec ">"
display-name=*token|quoted-string
addr-spec=SIP-URL|URI|ITAD_PATH
SIP-URL="sip:" [userinfo "@"] hostport url-parameters [headers]
ITAD_PATH="itad_path=" ITAD_Identifier
**ITAD_Identifier=*(ITAD_id ";")**
**ITAD_Id=1*32DIGIT;**

The ITAD_PATH field is a list of identifiers of the ITAD telephony domains which will be traversed by the SIP messages.

3. Example

Figure 7A:
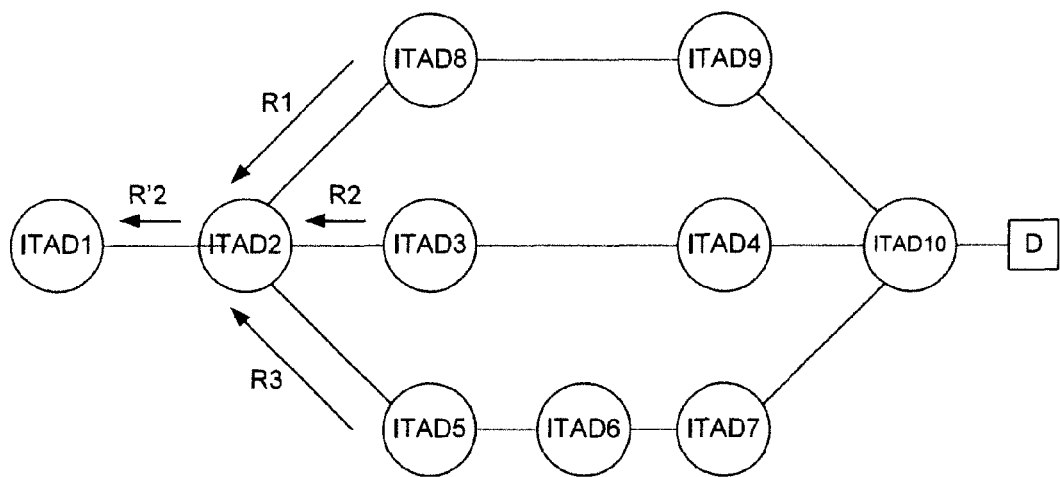
FIGS. 7a schematically illustrates, in an example, an implementation of an embodiment of the invention, which pertains to the normal situation when there is no congestion.
Figure 7B:
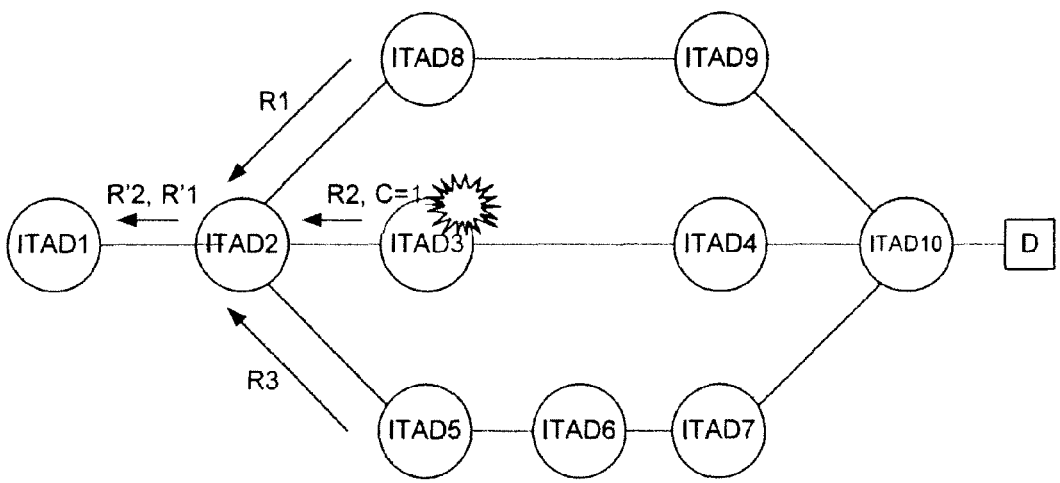
FIG. 7b schematically illustrates, in an example, an implementation of an embodiment of the invention, which pertains to the detection of a congestion.

The FIGS. 7A and 7B illustrate an example of an implementation of an embodiment of the invention. In FIG. 7A, the system works normally. In FIG. 7B, a congestion phenomenon appears in the ITAD3.

As can be seen in FIG. 7A, the ITAD2 domain has several routes to link up to the destination D. A first route which crosses the ITAD8, ITAD9 and ITAD10 domains, a second route which crosses the ITAD3, ITAD4, ITAD10 domains, and a third route which crosses the ITAD5, ITAD6, ITAD7 and ITAD10 domains.

No indication of congestion is received from its TRIP neighbors. Thus, the LSs of the ITAD2 domain choose a single route to link up to D and select it as being the best route. This route is the route R2 crossing the ITAD3, ITAD4 and ITAD10 domains. ITAD2 updates the information on this route and announces it to ITAD1.

Let us assume now that congestions 70 are detected in the ITAD3 field as illustrated in FIG. 7B.

ITAD3 has only one route to link up to D. Thus, it informs its neighbor, i.e. ITAD2, that the route to link up to D is congested, by sending an updating message with the field "C" positioned at "1".

Upon reception of this message, ITAD2 selects a backup route for the main route which it has already sent to ITAD1. In the example of FIG. 7B, the secondary route is the one that passes through the domains ITAD8, ITAD9 and ITAD10. This secondary route is identified by the "Flag" field positioned at 2.

Consequently, ITAD1 has two routes, one of which is congested. This domain can then convey calls to D without going through the congested domain and therefore satisfy its clients.

4. Second Embodiment

Replacement of an Existing Route

Here below, we present a second embodiment of the invention used to avert inter-domain congestion phenomena when the mechanism for managing multiple routes, such as those described here above, are no longer supported. This mode of implementing the method of the second embodiment of the invention is used to unload or discharge a route in a state of pre-congestion and remove the traffic through other paths, it relies on the use of an inter-domain telephone route exchange mechanism of the TRIP type. Other telephone inter-domain routing protocols can of course be used. The modifications as well as the procedure to be followed are described in detail here below.

4.1 Use of a Modified Trip Route Attribute

When a TRIP session is started between two neighboring LSs, these LSs exchange their respective management capabilities in terms of supported extensions as described in the document RFC3219. The optional attribute format, i.e. the capability attribute format, is described in FIG. 1. It can be noted that this attribute is optional and is not necessarily supported by all the TRIP implementations. It contains three fields 11, 12 and 13:

a first capability code field 11 with a length of two bytes containing a code that identifies Capability;

a second Capability Length field 12 also with a length of two bytes, contains the "Capability" length;

finally a third Capability Value field 13 whose size is variable, contains the Capability value.

To avert errors during the exchange of update messages containing modified TRIP route attributes indicating a congestion phenomenon, prevent a closure of the TRIP sessions and inform the pairs of a given LS of the congested route indication support, a new capability is introduced, known as a "Congested Route Capability" for which the capability code (the code defining the capability) is equal to 4.

Figure 4:
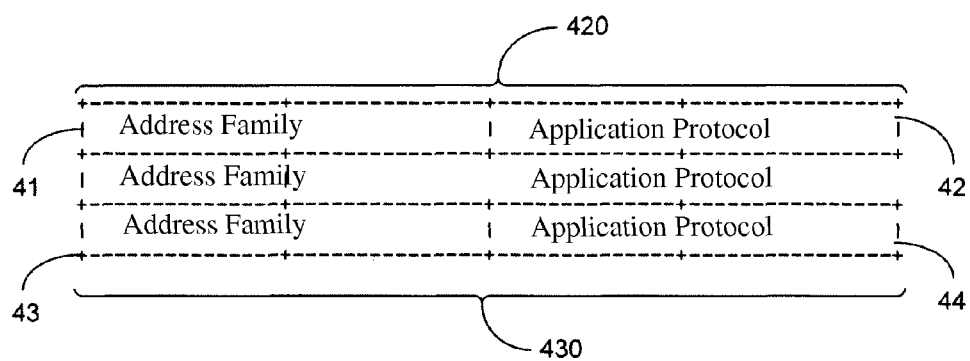
FIG. 4 illustrates the format of the "Capability Value" field of the new Multiple Route Capability attribute specific to an embodiment of the invention.

The format of the Capability Value field 13 of the Capability Information attribute specific to the "Congested Route Capability" is illustrated in FIG. 4. It comprises a series of "Address Family" fields 41 and Application Protocol fields 42, each of these fields having a size of two bytes. An LS pair informs its neighbors of the types of addresses supported which will be used during the valuing of the TRIP route fields. One or more pairs (Address Family, Protocol Application) can be entered. Referring to FIG. 4, a first pair 420 is formed from the fields 41 and 42 and second pair 430 is formed from the fields 43 and 44 for example.

The meanings of the "Address Family" and "Applications Protocol" fields 41, 42, 43, 44 are the same as those described in the section 5.1.1 of the RFC3219 and described in detail in an Appendix to an embodiment of the present invention.

Figure 5:
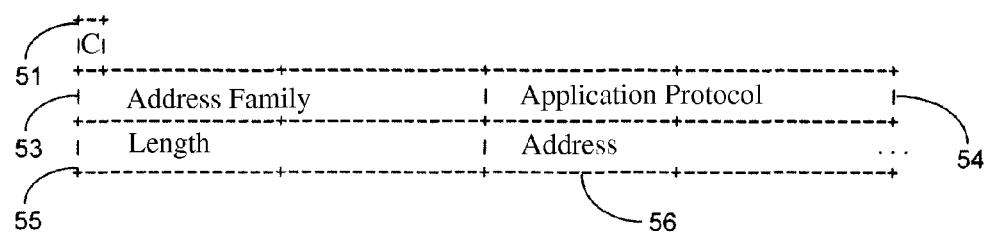
FIG. 5 presents the format of the "TRIP Route" field modified according to an embodiment of the invention for the transfer of backup routes.

Thus, according to an embodiment of the invention, in order to enable the announcing of the TRIP routes between the LS pairs supporting the "Congested Route Capability" the "TRIP Route" attribute is modified as shown in FIG. 5.

It contains five fields numbered 51 to 56, whose name and size are the following:

an "C" field 51 having a size of one bit;

an "Address family" field 53 having a length of two bytes;

an "Applications Protocol" field 54 with a length of two bytes;

a "Length" field 55 with a length of two bytes;

an "Address" field 56 of variable length.

The Address Family, Applications Protocol, Length and Address fields are defined in section 5.1.1 of the RFC3219 standard and set in an Appendix to the present description.

The new fields of an embodiment of the invention have the following meanings:

the C field 51 is used to characterize the announced route. It is positioned at "0" if the route is not congested and at 1 if the route is congested (the length of this field is one bit).

4.2 Procedure

Figure 8:
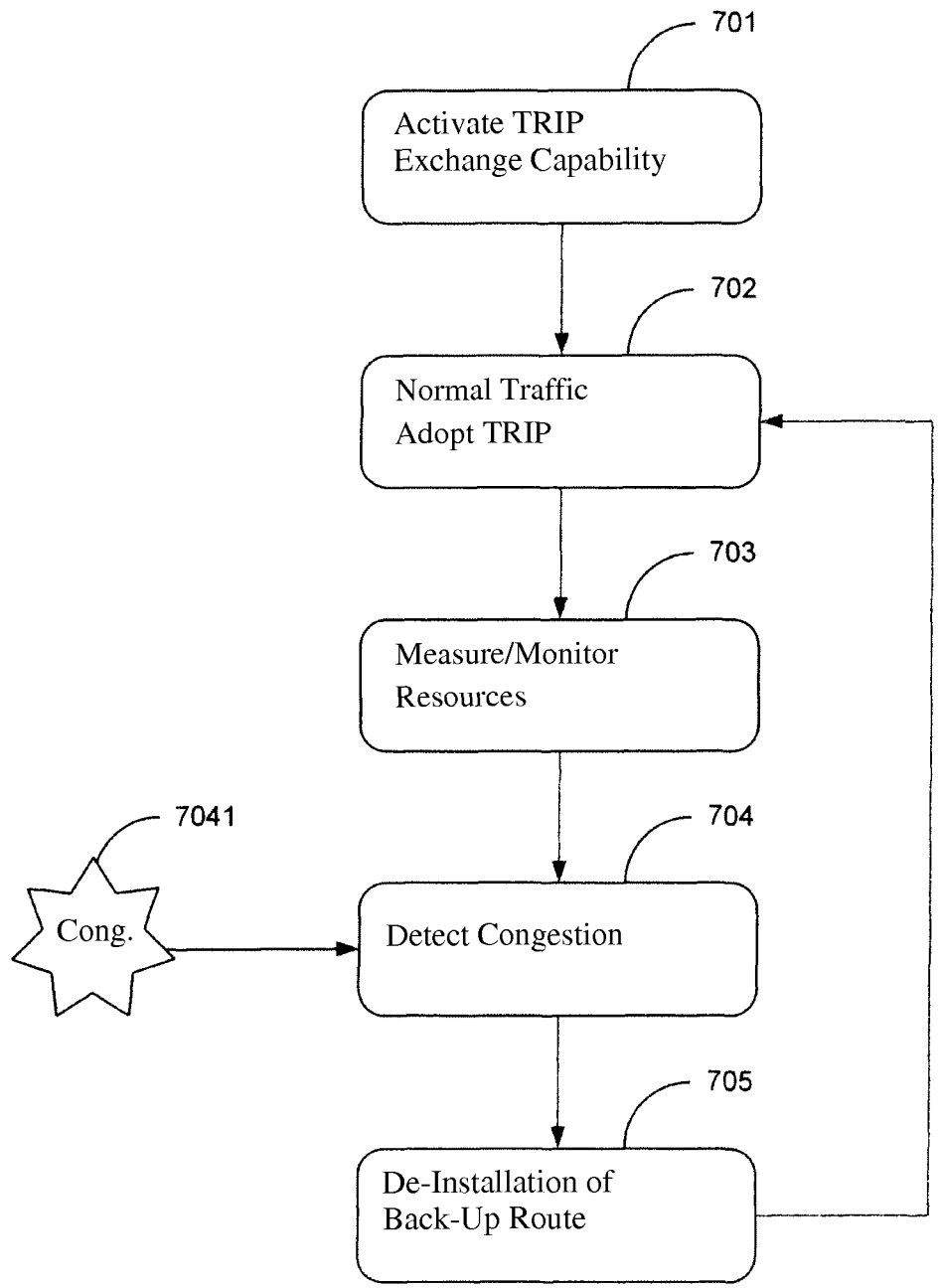
FIG. 8 describes a procedure for activating the process of taking charge of multiple routes linked with the detection of congestion phenomena.
Figure 9:
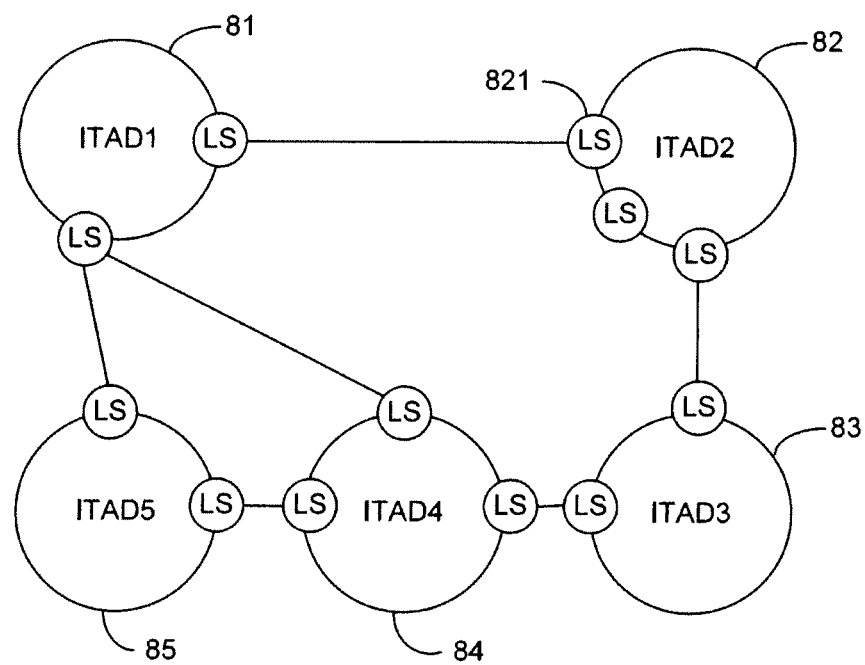
FIG. 9 presents an example, with reference to the prior art, of architecture of a network with activation of the TRIP protocol.
Figure 10:
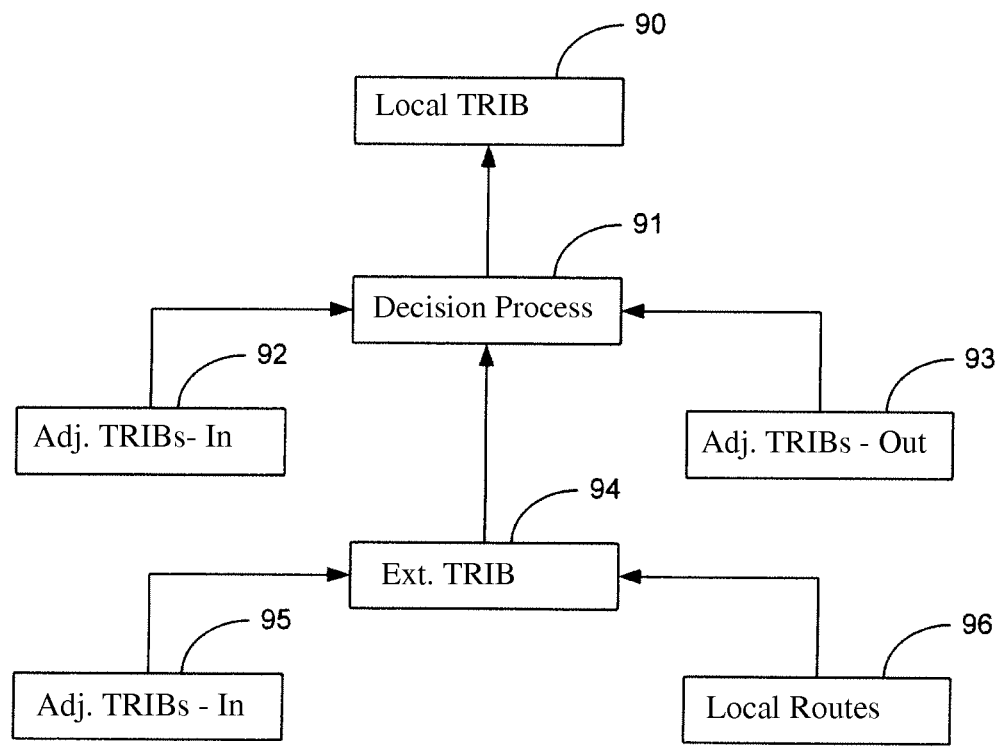
FIG. 10 illustrates the structure of the routing databases (TRIB) used by the locating servers (LS) routing the calls in the telephony domains (ITAD) presented in FIG. 9.

Referring to FIG. 8, we describe the different function of the steps to implement the activation procedure. This procedure consists of five steps:

activating the TRIP protocol (701) between two LS pairs. The exchange of one "Capability" to indicate the support of the modified routes is recommend (this Capability is aimed at informing the TRIP pair of the pre-congested route indication support);

in the case of normal traffic, adoption (702) of a classic TRIP behaviour and announcement of one and only one route per destination. Both pairs use the modified format of the "TRIP Route" attribute to enter information on the routes to be updated in the routing tables.

deployment (703) of means for measuring and monitoring telephone resources in order to detect congestions and scarcity of resources; these mechanisms are orthogonal to the procedure of propagating a congestion notification, the main aim of which is to inform remote telephone domains of a congested path that might impair the quality of service of the calls conveyed through routes where the congestion is detected; detecting (704) a congestion parameter 7041): the LS of the domain considered sends a message for eliminating the main route with an indication of congestion and an updating message containing a backup route to all its neighbors with an indication of non-congestion. The LS that has received these announcements installs the backup route as a new main route in its routing tables. The previous route (congested route) can be kept if it is used by a signaling server for a session being set up. However, the backup route must be used as a priority. In other words, the signaling server must firstly use the backup route and not the congested route except when the backup route is no longer valid;

de-installation (705) at request of the local LS, of the backup route and return to the state of adoption of the classic TRIP behavior (702) when the congestion phenomena have disappeared by using the previous main route.

4.3 Activating the Capability of Management of the Route with Indication of Congestion To guard against inter-domain congestion phenomena and increase the inter-domain call processing capability, namely to increase the availability of the service and reduce the rate of inter-provider call setup rejections, this particular embodiment of the invention implements the following procedure:

negotiating the capability of management of congested routes during the opening of TRIP session. When the TRIP session is open, the neighboring TRIP pairs activate the multiple route mechanisms by means of an exchange of capability or "Congested Route Capability";

once this capability exchange phase is completed, the neighboring TRIP pairs adopt the classic TRIP behavior and exchange one and only one TRIP route per telephone destination. Nevertheless, the format used to send the routes in an updating message is the new modified "TRIP Route" attribute defined in paragraph 4.1.

4.4. Indication of Congestion in the Route Announcements

To announce the TRIP routes, the modified new TRIP Route attribute is adopted by default. This TRIP Route attribute format contains the "C" field to indicate that a route is congested (c.f. 4.1).

4.5 Detection of Telephone Congestion Phenomena

In this embodiment, the detection of congestion phenomena is done in the same way as in the case of the propagation of multiple routes (c.f. 2.5).

4.6 Sending Backup Routes

The TRIP pairs exchange routing information as described in the initial specification of the TRIP protocol but in using the new TRIP route attribute format described here above (indication of congestion in the route announcements—paragraph 4.4). When the TRIP session is opened between the TRIP LSs, they exchange the route announcement support capability with an indication of congestion.

Once the congestion threshold is attained in an ITAD, the local LS sends an announcement containing backup routes to the destinations whose main path passes through the congested domain or domains indicating that it is itself in a congested state. These announcements to these destinations replace the routes already present in the LSs receiving the TRIP announcement when they are not used by the signaling servers for sessions in progress. These announcements also contain the "WithdrawnRoutes" attribute to indicate the congested routes to be withdrawn from the routing tables. These announcements contain routes with information entered by means of the modified TRIP route attribute as described here above.

For the backup routes, the "C" field of the TRIP Route attribute is positioned at 0 whereas for the routes with information entered by the "WithdrawnRoutes" attribute, the "C" field is positioned at 1.

This procedure can be reiterated if the backup route is congested in turn.

Should a local LS have no backup route and should the main route be congested, it uses the "C" field (in valorizing it) at 1 to inform its neighbors that this route is congested.

5. Appendix

| RFC3219 | |
| --- | --- |
| Code | Address Family |
| 1 | << Decimal Routing Number >> |
| 2 | << PentaDecimal Routing Numbers >> |
| 3 | << E.164 Numbers >> |
| Code | Protocol |
| 1 | SIP |
| 2 | H.323-H.225.0-Q.931 |
| 3 | H.323-H.225.0-RAS |
| 4 | H.323-H.225.0-Appendix-G |

Length

Corresponds to the length of the Address field in bytes;

Address:

Corresponds to the address (prefix) of the type of family given by the Address Family field. The length in bytes of the address is variable and is determined by the field length of the route.

6. Conclusion

Although the present disclosure has been described with reference to one or more examples, workers skilled in the art will recognize that changes may be made in form and detail without departing from the scope of the disclosure and/or the appended claims.

The invention claimed is:

1. A method for optimizing routing of communications between a plurality of IP telephony domains, wherein the method comprises:

during an initial propagating phase, propagating a main telephony route between first and second Internet Protocol (IP) telephony domains, which are managed by respective first and second operators of a communications system implementing a plurality of IP telephony domains, the main telephony route being used to reach a given telephone destination;

a phase of detecting with a device a phenomenon of telephonic congestion or of risk of telephonic congestion in the first IP telephony domain, managed by the first operator, wherein the phase of detecting comprises:

measuring at least one piece of information representing a load level and/or a rate of rejection of communications within said first IP telephony domain;

comparing said piece of information representing a load level and/or a rate of rejection with at least one predetermined threshold; and detecting the phenomenon of telephonic congestion or of risk of telephonic congestion based on a result of said comparing; and a phase of transmitting from the device in the first IP telephony domain to the second IP telephony domain at least one signaling message that defines a telephony route used to reach the given telephone destination, and wherein the signaling message comprises a field providing at least one piece of information on said phenomenon of telephonic congestion or of risk of telephonic congestion, called congestion information, and wherein transmitting said signaling message comprising the congestion information implies using a backup route for said main route.

2. The method according to claim 1, wherein the method comprises:

negotiating a capacity for exchanging said congestion information between said IP telephony domains, wherein negotiating is performed during a preliminary phase.

3. The method according to claim 1, wherein the method comprises, in said at least one second IP domain:

receiving said backup route or routes; and
adding said backup route or routes to a set of routes also comprising said main route.

4. The method according to claim 3, wherein the method comprises selecting a backup route from amongst at least two backup routes available in said set of routes, as a function of a piece of information on selection transmitted with each of said backup routes.

5. The method according to claim 1, wherein the method comprises, in said at least one second IP domain:

receiving said backup route; and
replacing a current route by said backup route.

6. The method according to claim 5, wherein the method comprises backing up said main route by said backup route within a routing table of a locating server situated within said second IP telephony domain.

7. The method according to claim 1, wherein the signal comprises an attribute comprising the following fields:

a telephonic congestion indicating field;
a backup route number indicator field;
a field defining an "address family" for said backup route;
a field defining an "application protocol" associated with said backup route;
a field defining an address length;
a field indicating said "address".

8. A system for optimizing communications between a plurality of Internet protocol (IP) telephony domains, wherein the system comprises:

an apparatus for detecting a phenomenon of telephonic congestion or of risk of telephonic congestion in a first IP telephony, said apparatus for detecting comprising a processor configured to deliver said congestion information, said processor further being configured to:

measure at least one piece of information representing a load level and/or a rate of rejection of communications within said first IP telephony domain;

compare said piece of information representing a load level and/or a rate of rejection with at least one predetermined threshold; and detect the phenomenon of telephonic congestion or of risk of telephonic congestion based on a result of said comparing, and an apparatus for optimizing routing of the communications between the plurality of IP telephony domains, the apparatus comprising:

a processor configured to route communications between the plurality of IP telephony domains of the communications system, said processor further being configured to:

propagate a main telephony route between the first IP telephony domain and a second IP telephony domain, which are managed by respective first and second operators of the communications system, the main telephony route being used to reach a given telephone destination;

transmit from the first IP telephony domain to the second IP telephony domain at least one signaling message that defines a telephony route used to reach the given telephone destination, and wherein the signaling message comprises a field providing at least one piece of information on the phenomenon of telephonic congestion or of risk of telephonic congestion in the first IP telephony domain, managed by the first operator, the at least one piece of information being called congestion information.

9. A non-transitory computer-readable carrier comprising a computer program stored thereon and comprising program code instructions for execution of a method for optimizing routing of communications between a plurality of Internet Protocol (IP) telephony domains when the instructions are executed by a processor, wherein the method comprises:

during an initial propagating phase, propagating a main telephony route between first and second IP telephony domains, which are managed by respective first and second operators of a communications system implementing a plurality of IP telephony domains, the main telephony route being used to reach a given telephone destination;

a phase of detecting with the processor, a phenomenon of telephonic congestion or of risk of telephonic congestion in a first IP telephony domain managed by a first operator, wherein the phase of detecting comprises:

measuring at least one piece of information representing a load level and/or a rate of rejection of communications within said first IP telephony domain;

comparing said piece of information representing a load level and/or a rate of rejection with at least one predetermined threshold; and detecting the phenomenon of telephonic congestion or of risk of telephonic congestion based on a result of said comparing; and a phase of transmitting from the first IP telephony domain to the second IP telephony domain at least one signaling message that defines a telephony route used to reach the given telephone destination, and wherein the signaling message comprises a field providing at least one piece of information on said phenomenon of telephonic congestion or of risk of telephonic congestion, called congestion information, and wherein transmitting said signaling message comprising the congestion information implies using a backup route for said main route.

\* \* \* \* \*